April 22, 1952 M. DEN HERTOG ET AL 2,593,419

CLASS OF LINE INDICATION IN TELEPHONE SYSTEMS

Filed May 22, 1947

INVENTORS
MARTINUS DEN HERTOG
AMEDEE CHARLES BERDEN
BY
Robert Harding Jr.
ATTORNEY Patented Apr. 22, 1952 2,593,419

UNITED STATES PATENT OFFICE 2,593,419

CLASS OF LINE INDICATION IN TELEPHONE SYSTEMS

Martinus den Hertog and Amedie Charles Berden, Antwerp, Belgium, assignors to International Standard Electric Corporation, New York, N. Y., a corporation of Delaware Application May 22, 1947, Serial No. 749,850
In Great Britain May 24, 1939

Section 1, Public Law 690, August 8, 1946
Patent expires May 24, 1959

16 Claims. (Cl. 179—18)

This invention relates to electric signaling systems.

The object of the invention is to provide simple and generally applicable means for signaling over a direct current signal loop which is for other purposes arranged to be used for signaling by brief interruptions of the loop.

According to the invention, such a system comprises means at the transmitting and receiving ends of the signal loop respectively for applying and responding to a condition (preferably the connection or absence of a unidirectional conductor) which is detectable only during an interruption of the loop.

The invention is particularly though not exclusively applicable to giving indications over telephone substation lines or P. B. X junctions, for instance, of restrictions regarding the type of connection allowable to a calling line.

Figure 1:
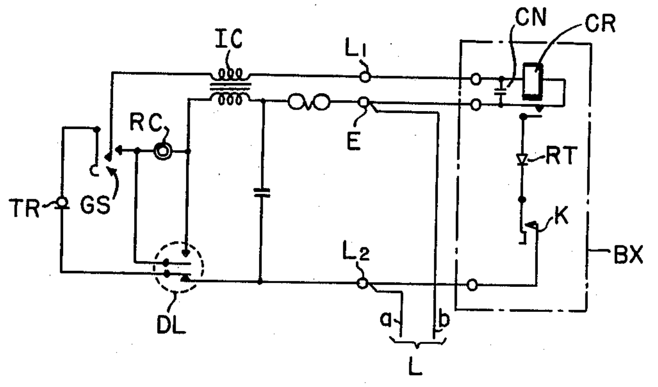
Figure 2:
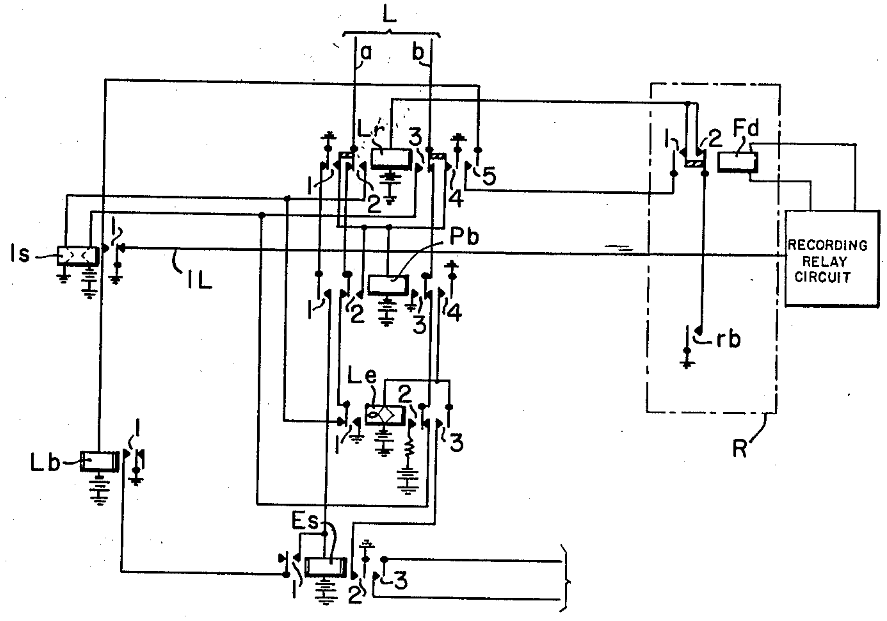

The invention will be clearly understood from the following description of one embodiment thereof shown in the accompanying drawing, in which Fig. 1 shows a telephone substation provided with a box containing rectifier equipment and a control key for applying a signaling condition to the substation line when required; and Fig. 2 shows impulse responsive equipment forming part of a register for instance at a telephone exchange and provided with equipment arranged to determine during a break in a loop circuit whether or not the substation rectifier equipment, Fig. 1, is connected up.

It is desired to give a signal from a subscriber's line to a telephone exchange in order to mark this line as being in a particular condition, so that it may either be barred from certain types of calls or may be given access to certain types of calls. The arrangements should be such that it is possible to bring the line into the condition in which it will give this discriminating indication under certain predetermined conditions, and will not give this discriminating signal for other conditions.

To make this clear, one example of its use will be given.

In countries where automatic dialing to rural and distant cities is being introduced, it is found desirable to provide facilities whereby subscribers can bring their lines into a condition whereby it is impossible to establish calls to rural and automatic long distance. This is, for example, required in order to permit private people to prevent the use of the telephone by servants for these classes of calls. On the other hand, the owner of the telephone should be able to make calls to rural and long distance when desired.

A second possibility is that city lines of a P. B. X should be brought in the condition in which access can be given to rural and automatic toll when the call is originated at one of the substations at the P. B. X entitled to this class of service, whereas the same city lines, when engaged by other substations entitled to city calls, but restricted from rural and automatic long distance service, should be brought in the condition in which the latter kind of service is made inaccessible.

A number of systems have already been designed to meet these requirements. One system was that the exchange made a check for the presence of ground connected to the line at the subscriber's premises. This ground was placed under the control of a key or a relay, and when closed gave to the exchange an indication to prevent the completion of calls to rural or toll. This scheme suffers from the disadvantage that it cannot be used when party lines are installed, because party lines usually have their ringers connected to ground.

Another scheme depended on the use of a special dial, which permitted a number of impulse trains to be sent, sufficient to permit local calls to be completed, but insufficient to complete automatic toll or rural calls. A scheme on similar lines was that, instead of providing a mechanical device on the dial, an electrical device was associated with the subscriber's line, to obtain the same object, i. e. counting the number of digits sent and preventing more than a predetermined number of figures to be sent for each call. Both schemes have the disadvantage that they require special apparatus with each line, and are rather expensive.

Yet other schemes have been proposed, based on the use of a rectifier connected in series with the subscriber's line and shunted by a condenser. The exchange was so arranged that when a certain number of figures has been dialed, indicating that the call was destined for a rural subscriber or for the automatic toll network, a check was made for the class of call by a reversal of the battery potential. Owing to the presence of the rectifier, no current would flow, after this reversal, through lines restricted from this service, and consequently the connection would be broken down.

The disadvantage of this scheme was that certain coin box systems depend on the reversal of battery and ground at the exchange for collecting the money, and it was therefore impossible to restrict coin boxes from making rural or toll calls. Yet another objection against this scheme is the fact that certain city junctions from P. B. X's are so arranged that their battery potential at the exchange, when the line is in the idle condition, is reversed with respect to the potential given when it is in the talking condition. This is in order that an indication can be given to the P. B. X when the line is freed at the exchange side and thereby prevent the city line from being taken at the P. B. X before it is liberated at the exchange. Also with this kind of subscriber line it was impossible to insert the rectifier, because this would prevent the operation of the line relay when a call is made.

The present invention also depends on the use of a uni-directional current carrying device such as a rectifier, but in principle this rectifier is not connected in series with the subscriber's line, but in parallel with the terminals of the subscriber set, so that it bridges the contacts of the dial and switch hook. By means of this arrangement, it is also possible to ascertain the presence or absence of a rectifier by making a reversal at the exchange, provided that this reversal is made during a dial impulse. It will be seen that the method referred to in the preceding paragraph depended on the reversal being made when no dial impulses were being received. With the new method, the fact itself that a dial impulse is sent after a certain number of figures have already being dialed, indicating that a call to rural or toll is required, will cause a momentary reversal of the battery and ground connections of the instepping circuit. It will be evident that when no rectifier is connected in parallel to the subscriber's set, the reversed current cannot pass through the line, because the circuit is opened by the dial. The presence of a rectifier, however, will permit the reversed current to pass, and therefore this fact may be used to recognize a line restricted from rural or toll calls.

When applied on single subscriber line circuits, the rectifier is connected over the contacts of a relay which operates in series with the line, in order that it will not be connected across the subscriber line when this is in the idle condition. This would, in case the line was called from the exchange, permit ringing current to pass through the rectifier in one direction, with the consequent result that the ringing trip relay might operate prematurely. The relay is made slow to release, so that it holds between dial impulses. This method is illustrated in the drawings.

Fig. 1 shows how the rectifier RT, together with a relay CR, a condenser CN shunting the winding of this relay, and a key K, can be mounted together in a box BX and connected by three wires to the terminals L1, E, L2 normally available on standard subscriber sets. On subscriber sets, the terminals E and L1 are normally strapped together, and the subscriber's line L is connected to terminals L1, L2 instead of to E, L2. By making a suitable box, and making the key in the form of a lock, it is possible to arrange that only when the lock is opened by an authorized person is the rectifier disconnected from the circuit to permit this line to work as an unrestricted line. The figure illustrates a conventional type of subscriber's set, including the transmitter TR, the receiver RC, the hook or traverse switch GS and the dial DL.

The arrangement at the exchange by means of which the presence of the rectifier is checked is shown in Fig. 2 and operates in the following manner.

Relay *Is* is the regular instepping relay, and may be assumed to be located in a register circuit of regular design. When the register is seized, contacts *rb* are closed and relay L*r* operates via *fd*2, *rb*. Earth via *lr*1, *lr*4 operates P*b*, which in turn operates relay L*e*. Relay I*s* is connected to the subscriber's line via front contacts *lr*2, *lr*3, and operates, energizing in turn slow release relay L*b* which remains operated during each impulse train. The first digit dialed is received by I*s* and recorded in the register R via lead IL in the normal way. This digit indicates whether the call is one to a local subscriber or special service, or to rural or automatic long distance. Assuming that this digit was found to indicate a call to rural or automatic long distance the relay F*d* will operate and change over the operating ground for relay L*r*, on the make before break spring combination *fd*1, to the front contact *is*1, under the control of a make contact *lr*5 on L*r* itself.

When now the second digit is dialed, the first impulse, when causing I*s* to release, also opens the circuit of L*r*, which now definitely unlocks and will be unable to re-operate, since both its first energizing circuit and its holding circuit are opened at *fd*2 and *lr*5 respectively. Slow release dialing relay L*b* energizes throughout each train of impulses. L*r* connects the *a* and *b* wires from the subscriber's line to the winding of relay P*b* via *pb*2 and to ground via *pb*3 respectively.

It will be evident that if a loop is present across the *a* and *b* wires, relay P*b* will hold. However, the battery and ground from relay P*b* are connected to the *a* and *b* wires in a reversed sense compared with the battery and ground supplies through the winding of I*s*.

If no rectifier is connected in parallel to the dial contact, P*b* will find no circuit closed via the subscriber's loop, and will instantly release after L*r* releases. Supposing this to happen, which is therefore the case on an unrestricted line, the subscriber's *a* and *b* wires are, for a short while, connected via front contacts *le*1, *le*2 to battery feed in the same sense as that supplied by I*s* which serves to charge the subscriber's line and condenser again in the same sense as when I*s* is connected. L*e* then releases. The consecutive release of L*r*, P*b* and L*e* can happen all in the time produced by one impulse from the subscriber's dial, so that when the dial closes after the first impulse, it will already find I*s* reconnected to the line via back contacts of these three relays. The reception of the second digit, therefore, is continued in the normal way, and as none of the relays L*r*, P*b* or L*e* can re-energize, they have finished their duty.

Assuming, however, that the register was connected to a restricted line, P*b* would hold via the rectifier RT, Fig. 1, which is in parallel to the dial impulse contacts during the time the first dial impulse lasts, and would complete the circuit for the slow operating relay E*s* via *pb*1, *lr*1, for a sufficient time to permit the latter relay to energize. Relay E*s* will not be able to energize during the short time it receives current on an unrestricted line, viz. during the time P*b* takes to release on an open line. When E*s* operates, it provides a holding circuit for L*e*, so that I*s* is definitely disconnected from the line, and it may via *es*3 cause the release of the connection in any proper manner, as will be determined by the method of operation of the register. Instead of causing the connection to release, it is possible to provide a busy tone to the subscriber until he releases the call. Relays *Pb*, *Le*, *Es* remain energized while the loop persists.

In the case of P.B.X's there is usually a relay provided in the city junctions at the P.B.X which repeats the dial impulses received from the substation. At such P.B.X junctions it will be sufficient to shunt the contact of this relay by a rectifier connected in such a sense that it does not pass current in the normal direction. When the arrangement is such that ringing current can reach this rectifier, some means, such as a relay similar to the relay *Cr* of Fig. 1, must be used to disconnect the rectifier when the junction is in use. However, when, as is usual, the city lines of P.B.X's are so arranged that ringing current from the exchange cannot reach the point where the rectifier is connected, no such relay is required.

It may now further be arranged that in the city junction a relay is provided which operates for certain predetermined substation lines only, and which controls the rectifier. This may, for example, be arranged by causing this relay to operate over a brush of the junction finder by means of which the city line is given access to the substations, and providing a circuit for the operation of this relay via the finder terminals corresponding to substations entitled to automatic rural and toll calls. It will be seen that in this way it is possible that certain substations may be given access to the city, without having the right to call in the rural or automatic toll area, and P.B.X substations may therefore be divided into three classes.

(*a*) Those not having access to the city junctions.

(*b*) Those having access to the city junctions but restricted from automatic rural and toll calls.

(*c*) Unrestricted.

Although this arrangement has been described in conjunction with subscriber lines and P.B.X lines, a similar method of operation may be used also on inter-exchange junctions on which dialing happens by means of direct current impulses, and it is therefore in no way restricted to use on subscriber lines alone. In such a manner, it may, for example, be used in rural areas to mark to the main exchange whether the call is originated from one class of rural exchange or the other; for example, the purpose of determining tariff. The arrangement may also be used in other types of electric signaling systems. In short, this method may be used on all d. c. line circuits on which signaling takes place by momentarily breaking a circuit, and where it is required to give a distinction to mark one out of two conditions from one end of the line to the other.

What is claimed is:

1. An electric signaling system, comprising a direct current signal loop, means at a transmitting station for transmitting signals over said loop by successive brief interruptions of the loop, means at a receiving station responsive to said interruptions for receiving said signals, a unidirectional conductor, controllable means for connecting the conductor across the loop in a direction to oppose the passage of normal signaling current through the conductor, said conductor forming a circuit with said loop, means for applying reverse potential to said circuit during an interruption, and an element responsive to a flow of current through said circuit resulting from said applied potential, said flow occurring only when the conductor is connected to the loop and therefore indicating the existence of said connection.

2. An electric signaling system as set forth in claim 1, in which the means for connecting the conductor includes a manually operated switching device.

3. An electric signaling system as set forth in claim 1, in which the means for connecting the conductor includes a relay and means for energizing said relay only during a signal transmission period.

4. An electric signaling system, comprising a direct current signal loop, means at a transmitting station for transmitting signals over said loop by successive brief interruptions of the loop, a unidirectional conductor, switch means at the transmitting station for connecting said conductor in shunt across the loop in the direction which prevents flow of signaling current through the conductor, means at a receiving station responsive to said interruptions for receiving said signals, means at the receiving station for applying reverse current to the loop, and an element responsive to the flow of reverse current through said loop and the unidirectional conductor when said conductor is connected across the loop.

5. An electric signalling system as set forth in claim 4, including means for restoring the direction of the loop current to normal after the application of reverse current during an interruption of the loop.

6. An electric signaling system as set forth in claim 4, including means responsive to a predetermined signal for placing the reverse current responsive means in operative condition.

7. An electric signaling system comprising a direct current signal loop, means at a transmitting station for transmitting signals over said loop by successive brief interruptions of the loop, a unidirectional conductor, means including a switching device at the transmitting station for connecting said conductor in shunt across the loop, means at a receiving station responsive to said interruptions for receiving said signals, means for applying reverse current to said loop at the receiving station, means responsive to the flow of reverse current through said loop and conductor for disconnecting the loop from the signal receiving means, and means responsive to a predetermined signal for placing the reverse current responsive means in operative condition.

8. An electric signaling system as set forth in claim 7, in which the means for disconnecting the receiving means includes a first relay having front contacts connected in series between said loop and receiving means, means for normally energizing said relay during the transmission of signals, and means for de-energizing said relay responsive to a predetermined signal.

9. An electric signaling system as set forth in claim 7, in which the signal receiving means includes a register, means including an instepping relay for transmitting signals from the loop to the register, the means for disconnecting the loop from the receiving means including a first relay having contacts connected in series between the loop and the instepping relay, and means responsive to a predetermined signal for de-energizing said first relay and thereby disconnecting the loop from the instepping relay.

10. An electric signaling system as set forth in claim 7 including a second relay, means for energizing the second relay through contacts of the first relay, and means connected to the loop through the second relay for applying reverse current to the loop.

11. An electric signaling system as set forth in claim 7, including a second relay, means for energizing the second relay through contacts of the first relay, and means operative upon release of the first relay for applying normal signal current to the loop.

12. An electric signaling system comprising a signal circuit, means for transmitting a series of signals over said circuit, a signal receiver normally connected to said circuit, means responsive to a predetermined one of said series of signals for initiating the disconnection of said circuit from said receiver between the end of the predetermined signal and the beginning of the succeeding signal, and controllable means for rendering said last-mentioned means operative or inoperative.

13. A system as set forth in claim 12, in which the signal circuit comprises a loop and the means for transmitting signals comprises means for periodically interrupting said loop.

14. A system as set forth in claim 12, in which the controllable means includes manually controlled switch means for completing the circuit with respect to said disconnecting means, arranged to place the disconnecting means in and out of operation at will.

15. An electric signaling system comprising a signal circuit means for transmitting a series of signals over said circuit, a register, means for transferring said signals from the circuit to the register, and means responsive to a predetermined signal for disconnecting the circuit from the register between the end of said predetermined signal and the beginning of the next signal.

16. An electric signaling system comprising a signal circuit, means at a transmitting station for transmitting signals over said circuit, a register at a receiving station, means for transferring said signals from the circuit to the register, means at the receiving station responsive to a predetermined signal for disconnecting the circuit from the register, and manually controlled means at the transmitting station for placing said disconnecting means in and out of operation.

MARTINUS DEN HERTOG.
AMEDIE CHARLES BERDEN.

REFERENCES CITED

The following references are of record in the file of this patent:

UNITED STATES PATENTS

| Number | Name | Date |
|---|---|---|
| 826,090 | Doran | July 17, 1906 |
| 1,831,385 | Hague | Nov. 10, 1931 |
| 1,855,074 | Vigren | Apr. 19, 1932 |
| 2,041,933 | Inglis | May 26, 1936 |
| 2,041,964 | Sandalls | May 26, 1936 |
| 2,052,057 | Reid | Aug. 25, 1936 |
| 2,137,409 | Martin | Nov. 22, 1938 |
| 2,206,147 | Zimmermann | July 2, 1940 |
| 2,248,575 | Lomax | July 8, 1941 |
| 2,332,872 | Shann | Oct. 26, 1943 |
| 2,348,301 | Lomax | May 9, 1944 |
| 2,372,262 | Edwards | Mar. 27, 1945 |